US012696002B2

(12) United States Patent
Lore et al.

(10) Patent No.: US 12,696,002 B2
(45) Date of Patent: Jul. 28, 2026

(54) NEUROMORPHIC SENSOR-BASED VIRTUAL SENSOR

(71) Applicant: Raytheon Company, Arlington, VA (US)

(72) Inventors: Kin Gwn Lore, Belmont, MA (US); Kishore K. Reddy, Farmington, CT (US); Ganesh Sundaramoorthi, Duluth, GA (US)

(73) Assignee: Raytheon Company, Arlington, VA (US)

( * ) Notice: Subject to any disclaimer, the term of this patent is extended or adjusted under 35 U.S.C. 154(b) by 7 days.

(21) Appl. No.: 18/640,778

(22) Filed: Apr. 19, 2024

(65) Prior Publication Data

US 2024/0357245 A1     Oct. 24, 2024

Related U.S. Application Data

(60) Provisional application No. 63/461,075, filed on Apr. 21, 2023.

(51) Int. Cl.
*H04N 23/951* (2023.01)
*G06T 3/4046* (2024.01)
*G06T 3/4053* (2024.01)

(52) U.S. Cl.
CPC ......... *H04N 23/951* (2023.01); *G06T 3/4046* (2013.01); *G06T 3/4053* (2013.01)

(58) Field of Classification Search
CPC .. H04N 23/951; H04N 5/2226; G06T 3/4046; G06T 3/4053; G06T 7/74
See application file for complete search history.

(56) References Cited

U.S. PATENT DOCUMENTS

| | | | | |
|---|---|---|---|---|
| 2019/0197667 A1* | 6/2019 | Paluri | ................... | G06T 3/4046 |
| 2020/0193635 A1* | 6/2020 | Su | ................... | G06T 7/74 |
| 2021/0104018 A1* | 4/2021 | Moon | ................... | G06T 3/4053 |
| 2022/0044478 A1* | 2/2022 | Tashiro | ................ | H04N 5/2226 |
| 2024/0185383 A1* | 6/2024 | Hong | ................... | G06T 3/4053 |
| 2024/0211540 A1* | 6/2024 | Olsen | ................... | G06T 3/4046 |

* cited by examiner

*Primary Examiner* — Hung H Lam
(74) *Attorney, Agent, or Firm* — Schwegman Lundberg & Woessner, P.A.

(57) ABSTRACT

Embodiments regard implementing operations that provide a virtual sensor. A method includes receiving, from a neuromorphic sensor, a time series of delta images, receiving auxiliary data indicating (i) an orientation, location, direction, or speed of the neuromorphic sensor, or (ii) metadata of the neuromorphic sensor, the auxiliary data associated with about a same time as the time series of images, operating, based on an image of the time series of delta images and auxiliary data of the auxiliary data associated with the image as occurring at about a same time, a first machine learning (ML) model resulting in a low-resolution image, and operating, based on the low-resolution image, a second ML model resulting in a high-resolution image, the high-resolution image of a type different than that produced by the neuromorphic sensor.

20 Claims, 7 Drawing Sheets

100

500

550 — RECEIVE, FROM A NEUROMORPHIC SENSOR, A TIME SERIES OF DELTA IMAGES

552 — RECEIVE AUXILIARY DATA INDICATING (I) AN ORIENTATION, LOCATION, DIRECTION, OR SPEED OF THE NEUROMORPHIC SENSOR, OR (II) METADATA OF THE NEUROMORPHIC SENSOR, THE AUXILIARY DATA ASSOCIATED WITH ABOUT A SAME TIME AS THE TIME SERIES OF IMAGES

554 — OPERATE, BASED ON AN IMAGE OF THE TIME SERIES OF DELTA IMAGES AND AUXILIARY DATA OF THE AUXILIARY DATA ASSOCIATED WITH THE IMAGE AS OCCURRING AT ABOUT A SAME TIME, A FIRST MACHINE LEARNING (ML) MODEL RESULTING IN A LOW-RESOLUTION IMAGE

556 — OPERATE, BASED ON THE LOW-RESOLUTION IMAGE, A SECOND ML MODEL RESULTING IN A HIGH-RESOLUTION IMAGE, THE HIGH-RESOLUTION IMAGE OF A TYPE DIFFERENT THAN THAT PRODUCED BY THE NEUROMORPHIC SENSOR

NEUROMORPHIC SENSOR-BASED VIRTUAL SENSOR

CLAIM OF PRIORITY

This patent application claims the benefit of U.S. Provisional Patent Application No. 63/461,075, filed Apr. 21, 2023, which is incorporated by reference herein in its entirety.

TECHNICAL FIELD

Embodiments provide for a virtual image sensor. The image sensor does not use an image camera of the type normally needed to generate an image. Embodiments leverage a neuromorphic camera and optionally with auxiliary sensors to generate the image.

BACKGROUND

Neuromorphic (NM) cameras can capture imagery of high-speed objects with a minimal amount of motion blurring. The high-speed is as compared to conventional visible image spectrum (e.g., red, green, blue (RGB)) video cameras. Having both NM sensor and RGB camera may not always be practical due to certain business needs and restrictions.

BRIEF DESCRIPTION OF THE DRAWINGS

FIG. 5 illustrates, by way of example, a diagram of an embodiment of a method for generating or providing a high resolution and high frame rate virtual image sensor.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

It is of interest to obtain a full color, depth, or a combination thereof, representation of NM images either for analysis or application with RGB-based algorithms. Embodiments propose a system for translating NM sensor data (sometimes called delta images) into red, green, blue (RGB) image/video data (e.g., with color). The system is first trained with registered images from an NM sensor and a collocated image sensor of a different type than the NM sensor. A mapping is established between NM data and image sensor data using an accumulation algorithm and NNs. The NN is trained to super-resolve the NM data to generate high-resolution images (e.g., from low-res NM data to high-res color images). The system is trained in an end-to-end manner by jointly learning NM-to-color domain translation and the super-resolution task.

NM sensors are capable of very high speed imaging, which is superior to standard imaging cameras in both frame rate and quality as they are not susceptible to motion blurring. With the virtual sensor approach, it is possible to visualize color representation of the object/scene from NM data, while keeping the high frame rate. An additional benefit is that the system can generate high resolution color images from only a single low-resolution NM sensor.

Figure 1:
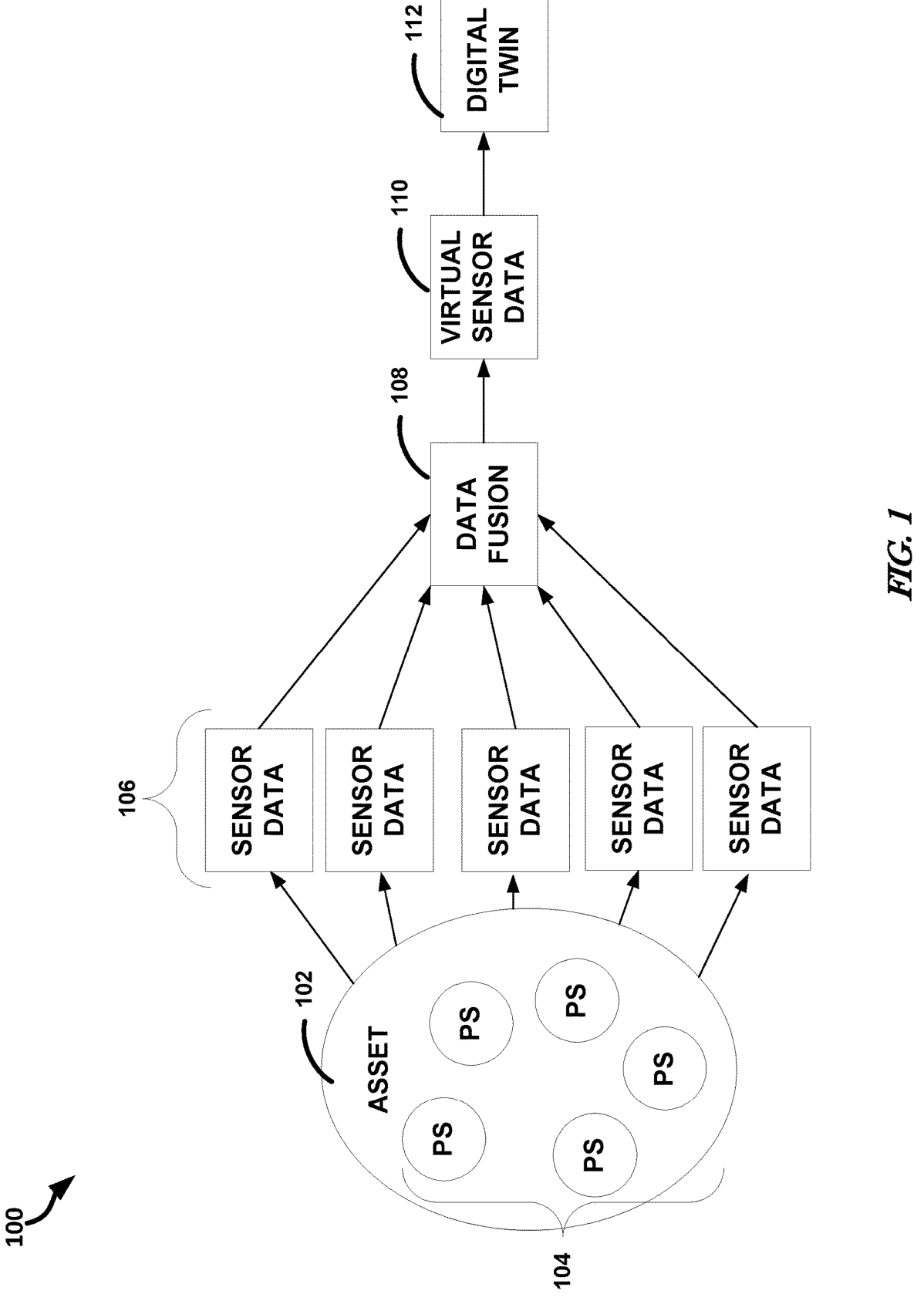
FIG. 1 illustrates, by way of example, a diagram of an embodiment of a system for virtual image sensing.

FIG. 1 illustrates, by way of example, a diagram of an embodiment of a system 100 for virtual image sensing. The imaging is virtual because a first image that is generated is of a first type and a second type of a second image that is used to generate the first image is different from the first type. The system 100 as illustrated includes an asset 102 with multiple sensors 104. One of the sensors is a neuromorphic (NM) imaging sensor. One or more of the sensors 104 can include an accelerometer, gyroscope, hall effect, or other motion, position, or orientation sensor. Data 106 from the sensors 104 can be fused using a data fusion operation 108. The data fusion operation 108 can be performed using one or more machine learning (ML) models. Results of the data fusion operation 108, sometimes called virtual sensor data 110, can be used to generate an image of a different type than that generated by the NM sensor, such as a color image, a depth image, or a combination thereof. A digital twin 112 is thus generated using the asset 102. The digital twin 112 provides an image of a type different from that produced by the NM sensor.

An NM sensor, sometimes called an event camera, senses changes in light intensity per pixel. When a change in a pixel is observed by the NM sensor, the pixel is triggered. An NM sensor supports low transmission bandwidth since a typical number of pixels that have changed in a given NM image is less than 10% of the pixels in the NM sensor. This is at least in part because NM sensors operate at a high frame rate, thus there is less time between images generated by the NM sensor. The high frame rate means that the NM sensor can capture fast motion. The NM sensor also has a high dynamic range as compared to standard frame-based cameras. Dynamic range is a ratio between the brightest and darkest parts of an image, from pure black to brightest white. NM sensors also have a small size, low weight, and low power consumption as compared to standard RGB cameras.

Figure 2:
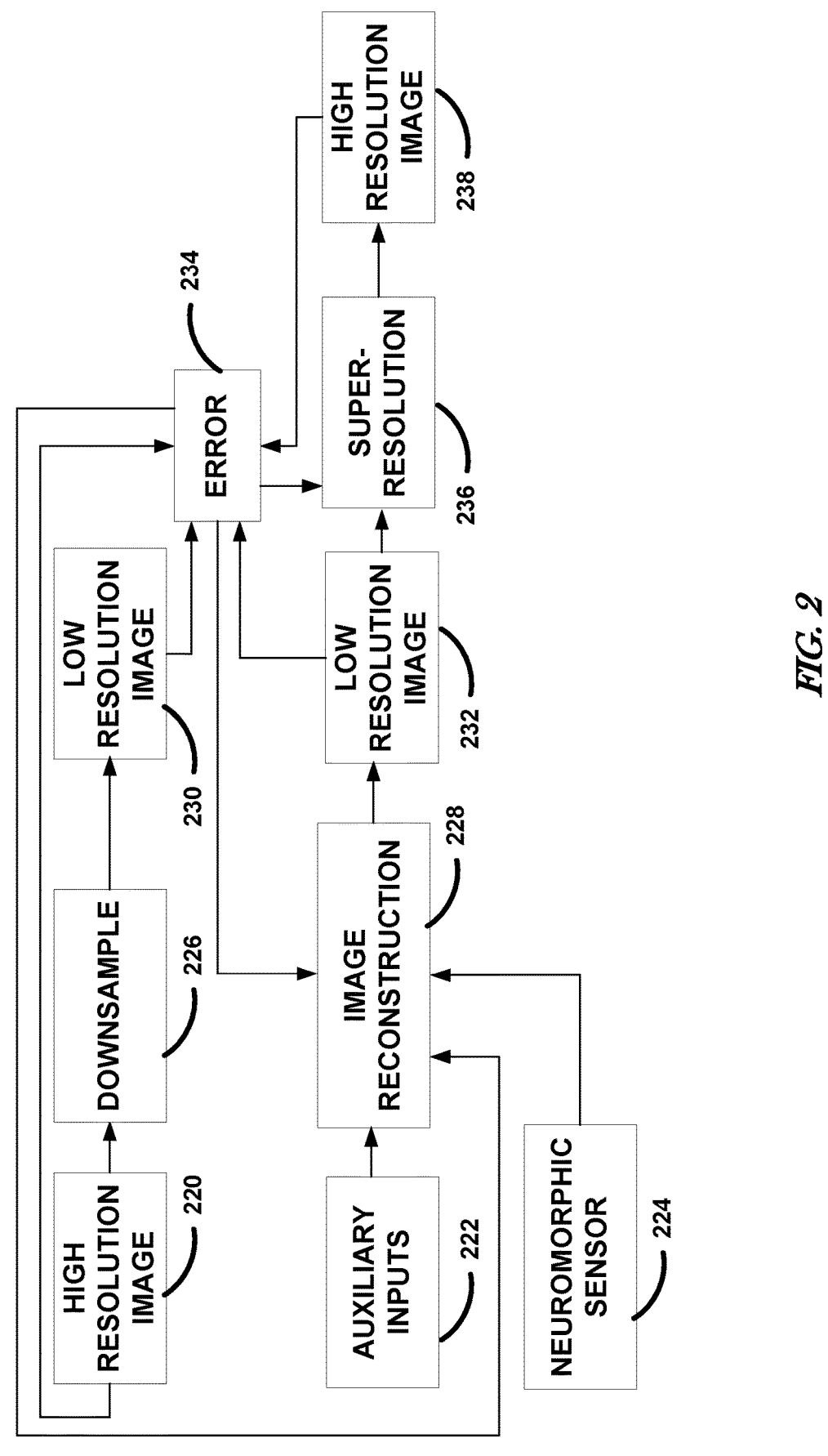
FIG. 2 illustrates, by way of example, a diagram of an embodiment of a training system that provides trained ML models that operate as a virtual imaging sensor.

FIG. 2 illustrates, by way of example, a diagram of an embodiment of a training system 200 that provides trained ML models that operate as a virtual imaging sensor. In the system 200, multiple machine learning (ML) models are used to generates a high resolution image 238 based on a low resolution image 232 that is constructed based on a neuromorphic sensor 224 output and one or more auxiliary inputs 222.

The system 200 as illustrated includes a first ML model 228 that performs image reconstruction. The first ML model 228 can include one or more recurrent neural network (RNN) layers, one or more convolutional neural network (CNN) layers, or a combination thereof. The first ML model 228 can generate the low resolution image 232 based on output from a neuromorphic sensor 224 and auxiliary inputs 222.

Low resolution, as used herein, means current typical event camera spatial resolution (e.g., 0.1-0.2 MegaPixels). High resolution, as used herein, means a resolution higher than the low resolution. A goal is to make a low resolution image, like that received from the low resolution event camera, a high resolution image, like that received from a high definition camera.

The low resolution image 232 is of a different type than the neuromorphic sensor 224. The low resolution image 232, when colored (whether using red, green blue (RGB), gray-scale, or other color scheme) and viewed, provides a human user with a view similar to using a standard camera. This is as opposed to the output of the neuromorphic sensor 224, output of a radio detection and ranging (RADAR) sensor, or the like. Different types of images include a color image, a grayscale image, an infrared image, a heatmap image, electro-optical image, hyperspectral image, or the like.

The neuromorphic sensor 224 is an event sensor that detects and reports on changes in field of view thereof. The neuromorphic sensor 224 typically has a high frame rate, such as 1 MHz. High frame rate, as used herein, means greater than 120 Hz. The neuromorphic sensor 224, thus has fewer pixels to report than a standard camera image. This is because of the short time between images and pixels that are of a same value are not reported. Since consecutive images from the neuromorphic sensor 224 are very close in time, the number of pixels that have changed between images is likely quite small. Thus, the bandwidth required to generate and provide a series of images from the neuromorphic sensor 224 is much lower than that of a standard sensor, such as the one used to generate the high resolution image 220.

Auxiliary inputs 222 provide information pertinent to the first ML model 228 in creating the low resolution image 232. The auxiliary inputs 222 can provide information regarding the position, velocity, direction, orientation, or parameters of the neuromorphic sensor 224. The auxiliary inputs 222 can thus include a global positioning system (GPS) or other geolocation sensor, accelerometer, gyroscope, hall effect sensor, metadata of the neuromorphic sensor 224 (e.g., frame rate, dynamic range, make, model, or the like), a combination thereof, or the like. Output from the auxiliary inputs 222 can be time-synchronized with output from the neuromorphic sensor 224. Such time-synchronization aligns the auxiliary inputs 222 with the images from the neuro-morphic sensor 224 so that the first ML model 228 has the most relevant auxiliary inputs 222 for given images from the neuromorphic sensor 224. The auxiliary inputs 222 can include data regarding about a same time as a corresponding output of the NM sensor 224. About a same time means the auxiliary data is pertinent for at least a portion of a time range in which a time-series of samples from the NM sensor 224 was captured.

The first ML model 228 receives the auxiliary inputs 222 and output of the neuromorphic sensor 224. The output of the neuromorphic sensor 224 is an image that indicates an amount of intensity change between an immediately previous image and a current image. The first ML model 228 generates a low resolution image 232. The low resolution image 232 is of a different type than that generated by the neuromorphic sensor 224. More details regarding possible configurations for the first ML model 228 are provided elsewhere.

Training of the first ML model 228 can be performed, at least partially, based on a difference between a ground-truth image, a low resolution image 230, and the low resolution image 232 generated by the first ML model 228. The low resolution image 230 can be generated using a sensor with a same, similar, or otherwise overlapping field of view as the neuromorphic sensor 224. The low resolution image 230 can be generated directly from an imaging sensor or can be indirectly generated using a higher resolution sensor. For example, a higher resolution imaging sensor can be used to generate a high resolution image 220. The high resolution image 220 can be used as a ground truth for the output, the high resolution image 238, of the system 200. The high resolution image 220 can be downsampled 226 to generate the low resolution image 230. Downsampling is sometimes referred to as "decimation". Downsampling can include anti-aliasing, which can include using a digital lowpass filter, and keeping only a subset of the anti-aliased samples (e.g., keeping only every $M^{th}$ sample, where M is an integer greater than one).

The low resolution image 232 from the first ML model 228 can be used as input to a second ML model 236. The second ML model 236 is a super-resolution model. A super-resolution model is a model that produces a higher resolution image 238 based on a lower resolution image 232. The second ML model 236 can be a CNN.

The first ML model 228 and the second ML model 236 can be trained concurrently. The first ML model 228 and the second ML model 236 can be trained based on a same error from an error operation 234.

The error from the error operation 234 can include a sum (e.g., a weighted sum) of errors. A first error can be from the first ML model 228 generating the low resolution image 232. A second error can be from the second ML model 236 generating the high resolution image 238. The first error can be based on differences between the low resolution image 230 and the low resolution image 232. The second error can be based on differences between the high resolution image 220 and the high resolution image 238. The first error and the second error can include a mean squared error, mean absolute error, Huber loss, root mean squared error, coeffi-cient of determination (sometimes called R-squared), adjusted R-squared, or the like.

After training, the first ML model 228 and the second ML model 236, jointly form a virtual imaging sensor that gen-erates the high resolution image 238 based on the auxiliary inputs 222 and output of a neuromorphic sensor 224.

Rather than receiving images from the neuromorphic sensor 224 and a collocated imaging sensor, the images can be provided by an already existing database of neuromor-phic sensor output, auxiliary inputs 222, and corresponding images 220.

Figure 3:
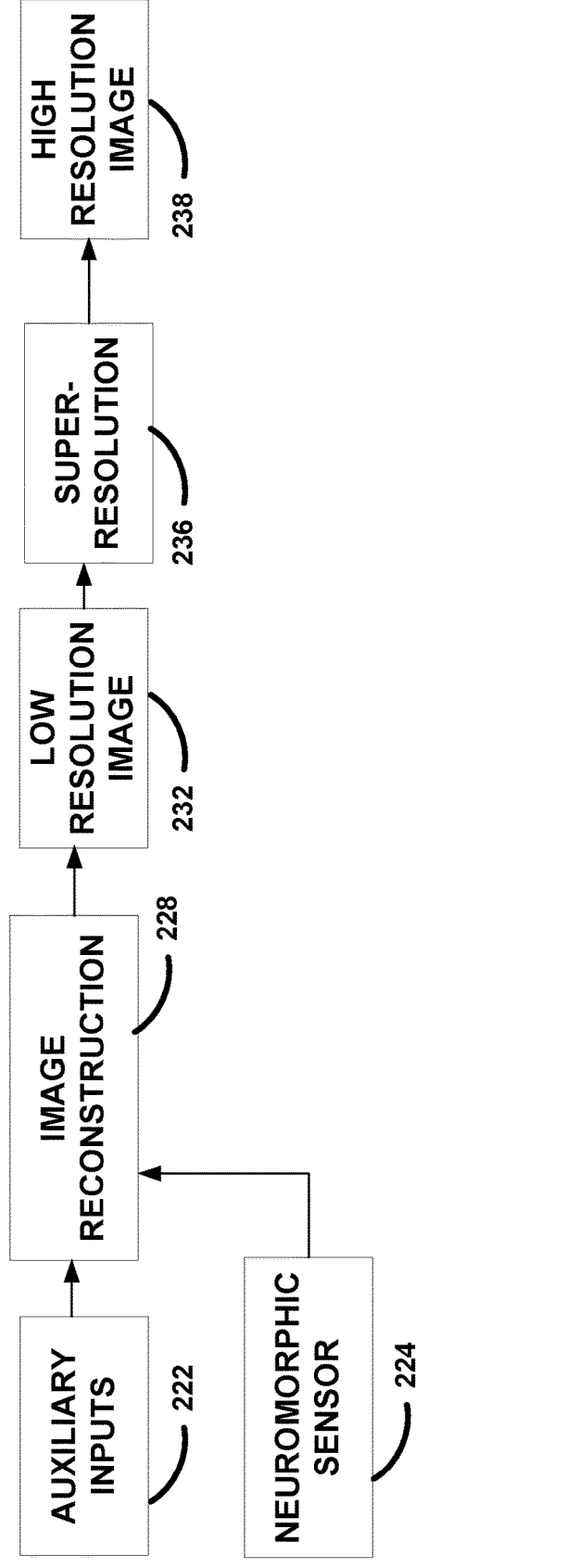
FIG. 3 illustrates, by way of example, a diagram of an embodiment of a system that operates as a virtual imaging sensor.

FIG. 3 illustrates, by way of example, a diagram of an embodiment of a system 300 that operates as a virtual imaging sensor. The system 300 is similar to the system 200, with the system 300 not including ground truth images 220, 230 and also not including the error operator 234. Using the system 300, the high resolution image 238 can be generated without using a corresponding high resolution camera. A smaller, more compact, higher bandwidth, higher dynamic range sensor, namely the neuromorphic sensor 224, can essentially be used in place of the high resolution imaging sensor while still providing functionality of the high reso-lution imaging sensor. The first ML model 228 generates the low resolution image 232 based on the auxiliary inputs 222 and output of the neuromorphic sensor 224. The second ML model 236 receives the low resolution image 232. The second ML model 236 produces the high resolution image 238 cased on the low resolution image 232.

Figure 4:
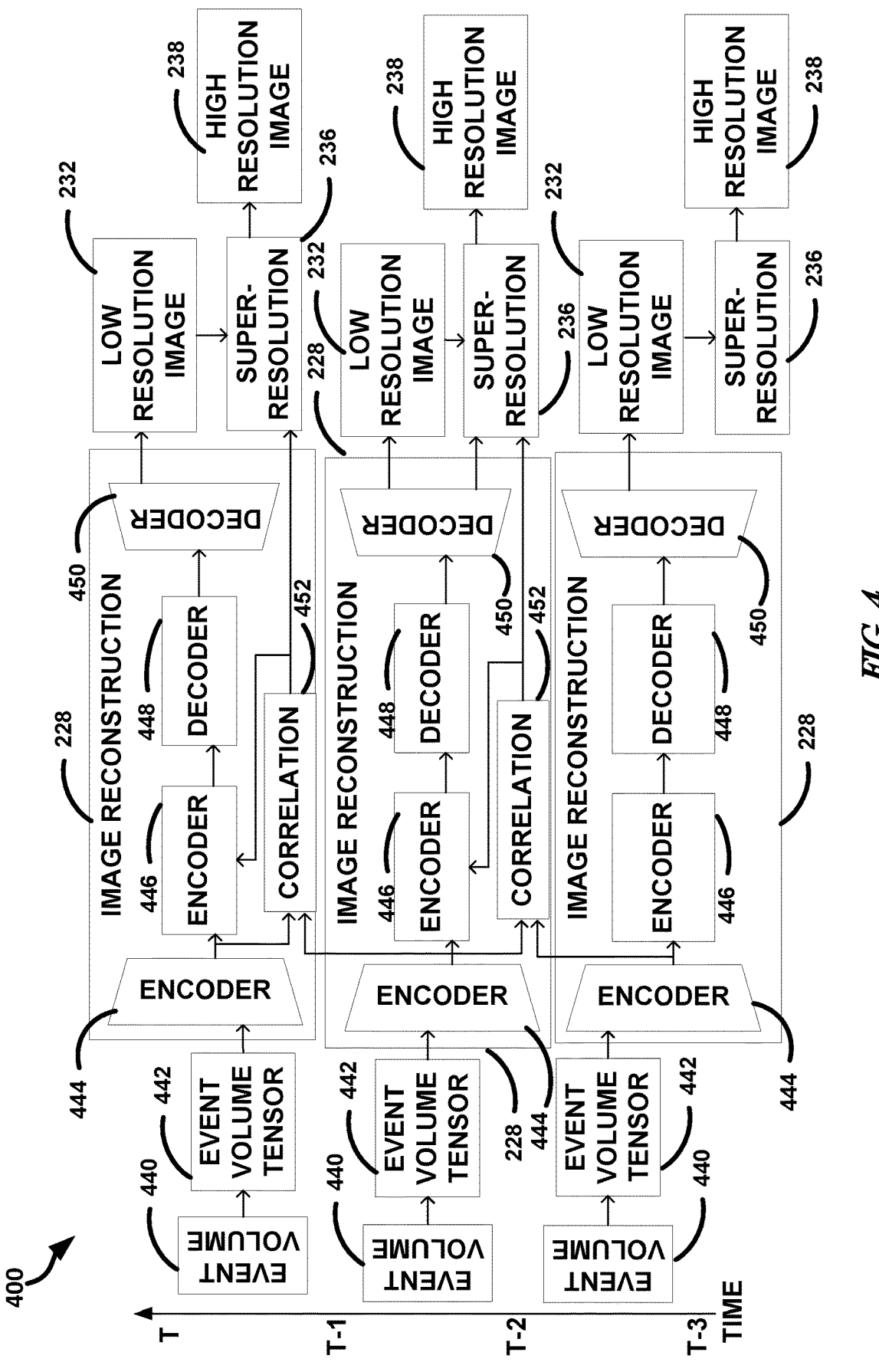
FIG. 4 illustrates, by way of example, a diagram of a time-series of a system that includes the system of FIG. 3 at different, consecutive time slices.

FIG. 4 illustrates, by way of example, a diagram of a time-series of a system 400 that includes the system 300 at different, consecutive time slices. The illustrated time slices include a first prior time slice (T–3), a second prior time slice (T–2), and third prior time slice (T–1). A current time slice (T) has yet to occur. For each of the time slices, an event volume 440 of images from the neuromorphic sensor 224 are processed. Event volumes 440 can have a same or differing number of samples (number of images from the neuromorphic sensor 224). The number of samples can be dependent on whether a pixel value in the field of view of the neuromorphic sensor 224 has changed and a desired frame rate of the virtual imaging sensor.

An event volume tensor 442 is a time series of outputs from the neuromorphic sensor 224 along with corresponding auxiliary inputs 222. The event volume tensor 442 includes a number of images from the neuromorphic sensor 224 from which the number of high resolution images 238 will be generated.

The first ML model 228 as illustrated in FIG. 4 includes a first encoder 444, a second encoder 446, a first decoder 448, a second decoder 450, and a correlation operator 452. The first encoder 444 is an event encoder. The first encoder 444 operates to encode responsive to an event. An event is a detected change in pixel intensity in the NM camera. A positive event means a pixel intensity went from darker to lighter. A negative event means a pixel intensity went from lighter to darker. The detection of a change is subject to a threshold internal to the NM camera. The first encoder 444 is a spatial encoder. The first encoder 444 operates to convert events into features representations that are compatible with an NN. The events can be transformed into event tensors, time surface representations, or the like. The first encoder 444 can be a convolutional NN.

Output of the first encoder 444 can be provided to the second encoder 446 and the correlation operator 452. The second encoder 446 can be a recurrent NN. The second encoder 446 can receive output of the correlation operator 452 and output the first encoder 444. The second encoder 446 that captures all features over all time steps within the analyzed time window.

The correlation operator 452 determines respective correlation matrices between first samples in consecutive neuromorphic sensor 224 event volumes 440. The correlation matrices indicate for an image chip and for each of location of the image in a different image, a correlation value for the image chip in the different image. An image chip size is a proper subset of the entire image. The correlation matrices indicate how much objects in the first sample of an immediately prior event volume have moved in a current event volume. The second encoder 446 can encode this movement into the output from the first encoder 444.

The first decoder 448 receives the output of the second encoder 446. The first decoder 448 can be a recurrent NN. The first decoder 448 operates to reverse the aggregated feature representation and decode them back into information associated with different time steps.

The second decoder 450 receives the output of the first decoder 448. The second decoder 450 can be a convolutional NN. The second decoder 450 operates to generate the low resolution image 232. The second decoder 450 transforms output of the first decoder 448 into a desired image modality.

The second ML model 236 operates on the low resolution image 232 to generate the high resolution image 238. The second ML model 236 is sometimes called a super-resolution model. Super-resolution models are known. Super-resolution models are typically formed from combinations of convolutional NN layers.

FIG. 5 illustrates, by way of example, a diagram of an embodiment of a method 500 for generating or providing a high resolution and high frame rate virtual image sensor. The method 500 as illustrated includes receiving, from a neuromorphic sensor, a time series of delta images, at operation 550; receiving auxiliary data indicating (i) an orientation, location, direction, or speed of the neuromorphic sensor, or (ii) metadata of the neuromorphic sensor or the environment surrounding the neuromorphic sensor, the auxiliary data associated with about a same time as the time series of images, at operation 552; operating, based on an image of the time series of delta images and auxiliary data of the auxiliary data associated with the image as occurring at about a same time, a first machine learning (ML) model resulting in a low-resolution image, at operation 554; and operating, based on the low-resolution image, a second ML model resulting in a high-resolution image, the high-resolution image of a type different than that produced by the neuromorphic sensor, at operation 556. The environment surrounding the neuromorphic sensor can indicate weather conditions, terrain (e.g., hills, water, roads, or the like), flora, fauna, or the like are present.

The method 500 can further include, wherein the time series of delta images is a first time series of delta images. The method 500 can further include receiving, from the neuromorphic sensor, a second time series of delta images, a last delta image of the first time series of delta images immediately preceding a first delta image of the second time series of delta images. The method 500 can further include receiving second auxiliary data indicating (i) an orientation, location, direction, or speed of the neuromorphic sensor during capture of the second time series of delta images, or (ii) metadata of the neuromorphic sensor, the second auxiliary data associated with about a same time as the second time series of images.

The method 500 can further include determining correlation values between pixels of a first image of the first time series of delta images that corresponds to a first earliest time of capture and pixels of a second image of the second time series of delta images that corresponds to a second earliest time of capture. The method 500 can further include, wherein the first ML model further operates based on the correlation values. The method 500 can further include, wherein the first ML model includes first and second encoders in series with each other and first and second decoders that are also connected in series.

The method 500 can further include, wherein the second encoder receives the correlation values. The method 500 can further include determining correlation values between pixels of a first image of the first time series of delta images that corresponds to a first earliest time of capture and pixels of a second image of the second time series of delta images that corresponds to a second earliest time of capture. The method 500 can further include, wherein the second ML model further operates based on the correlation values.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as object or condition recognition, device behavior modeling or the like. The first ML model 228, second ML model 236, first encoder 444, second encoder 446, first decoder 448, second decoder 450, or a portion thereof, can include or be implemented using one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 6:
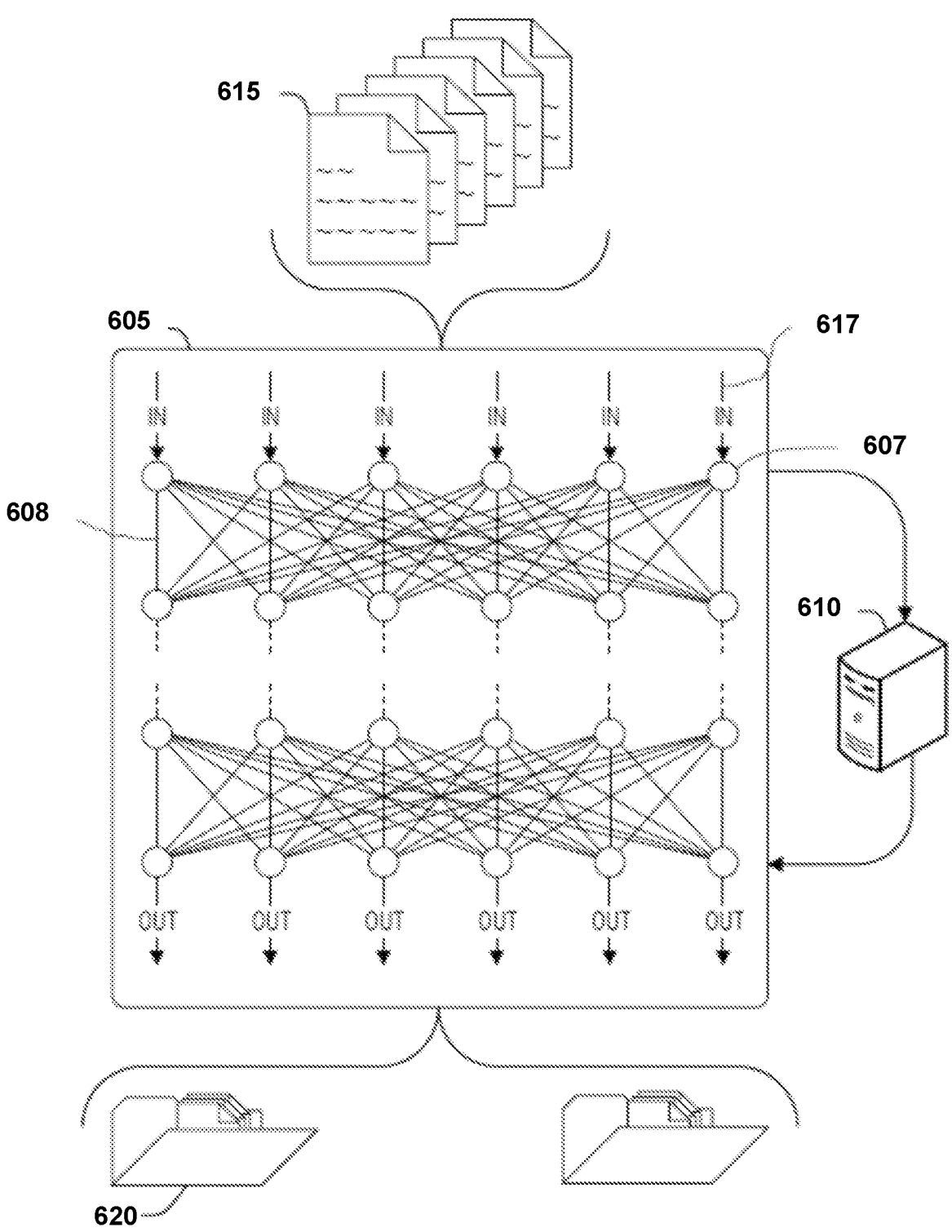
FIG. 6 is a block diagram of an example of an environment including a system for neural network training.

FIG. 6 is a block diagram of an example of an environment including a system for neural network training. The system includes an artificial NN (ANN) 605 that is trained using a processing node 610. The processing node 610 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 605, or even different nodes 607 within layers. Thus, a set of processing nodes 610 is arranged to perform the training of the ANN 605.

The set of processing nodes 610 is arranged to receive a training set 615 for the ANN 605. The ANN 605 comprises a set of nodes 607 arranged in layers (illustrated as rows of nodes 607) and a set of inter-node weights 608 (e.g., parameters) between nodes in the set of nodes. In an example, the training set 615 is a subset of a complete training set. Here, the subset may enable processing nodes with limited storage resources to participate in training the ANN 605.

The training data may include multiple numerical values representative of a domain, such as an image feature, or the like. Each value of the training or input 617 to be classified after ANN 605 is trained, is provided to a corresponding node 607 in the first layer or input layer of ANN 605. The values propagate through the layers and are changed by the objective function.

As noted, the set of processing nodes is arranged to train the neural network to create a trained neural network. After the ANN is trained, data input into the ANN will produce valid classifications 620 (e.g., the input data 617 will be assigned into categories), for example. The training performed by the set of processing nodes 607 is iterative. In an example, each iteration of the training the ANN 605 is performed independently between layers of the ANN 605. Thus, two distinct layers may be processed in parallel by different members of the set of processing nodes. In an example, different layers of the ANN 605 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 607 (e.g., neurons) are trained independently. In an example, the nodes are trained on different hardware.

Figure 7:
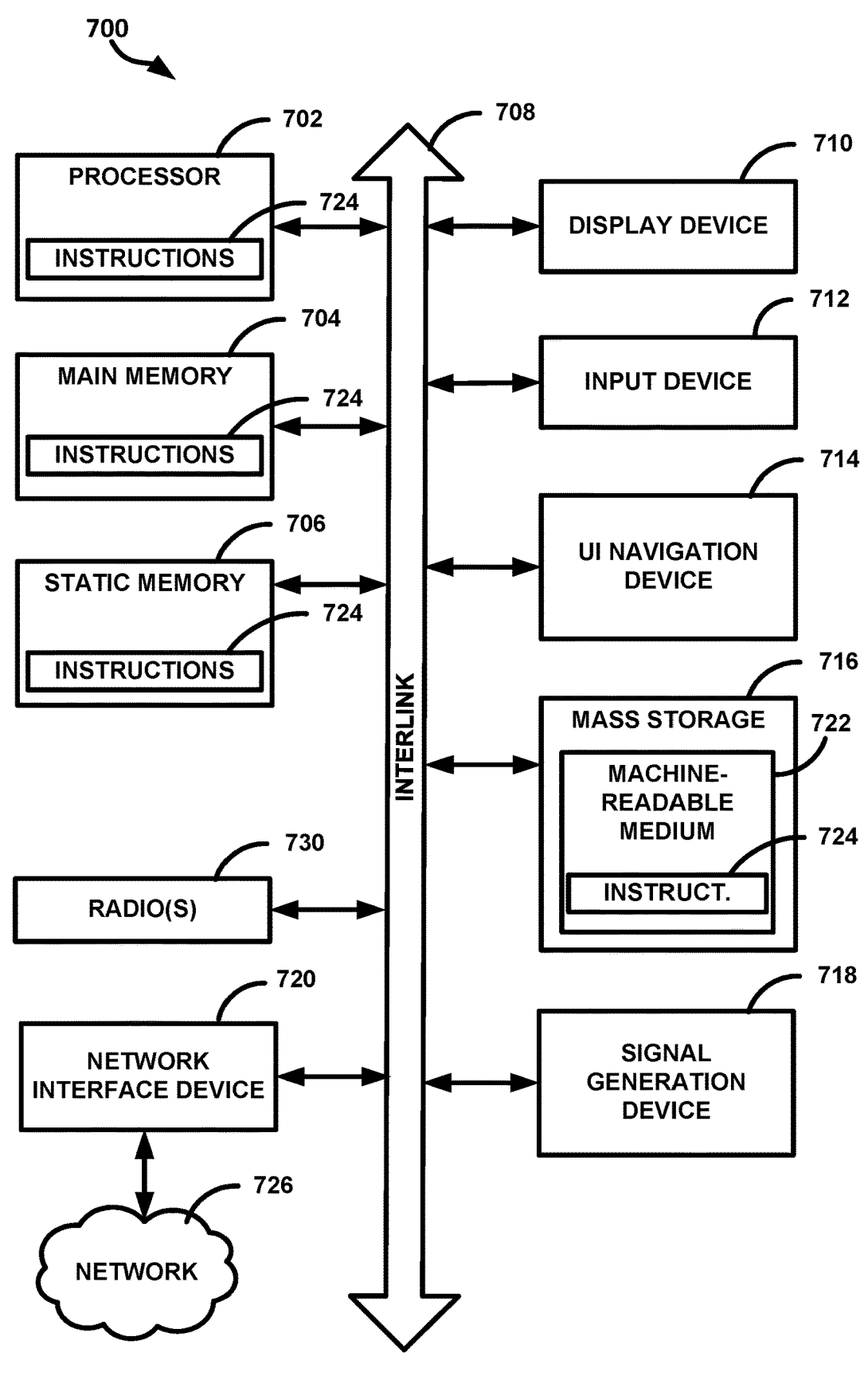
FIG. 7 illustrates, by way of example, a block diagram of an embodiment of a machine in the example form of a computer system within which instructions, for causing the machine to perform any one or more of the methods discussed herein, may be executed.

FIG. 7 illustrates, by way of example, a block diagram of an embodiment of a machine in the example form of a computer system 700 within which instructions, for causing the machine to perform any one or more of the methods discussed herein, may be executed. One or more of the asset 102, sensor 104, operation 108, digital twin 112, downsample operation 226, error operator 234, neuromorphic sensor 224, the first model 228, the second model 236, a component or operation thereof, or operations of the method 500, can include, or be implemented or performed by one or more of the components of the computer system 700. In a networked deployment, the machine may operate in the capacity of a server or a client machine in server-client network environment, or as a peer machine in a peer-to-peer (or distributed) network environment. The machine may be a personal computer (PC), server, a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a mass storage unit 716, a signal generation device 718 (e.g., a speaker), a network interface device 720, and a radio 730 such as Bluetooth, WWAN, WLAN, and NFC, permitting the application of security controls on such protocols.

The mass storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a method comprising receiving, from a neuromorphic sensor, a time series of delta images, receiving auxiliary data indicating (i) an orientation, location, direction, or speed of the neuromorphic sensor, or (ii) metadata of the neuromorphic sensor, the auxiliary data associated with about a same time as the time series of images, operating, based on an image of the time series of delta images and auxiliary data of the auxiliary data associated with the image as occurring at about a same time, a first machine learning (ML) model resulting in a low-resolution image, and operating, based on the low-resolution image, a second ML model resulting in a high-resolution image, the high-resolution image of a type different than that produced by the neuromorphic sensor.

In Example 2, Example 1 further includes, wherein the time series of delta images is a first time series of delta images, the method further comprising receiving, from the neuromorphic sensor, a second time series of delta images, a last delta image of the first time series of delta images immediately preceding a first delta image of the second time series of delta images.

In Example 3, Example 2 further includes receiving second auxiliary data indicating (i) an orientation, location, direction, or speed of the neuromorphic sensor during capture of the second time series of delta images, or (ii) metadata of the neuromorphic sensor, the second auxiliary data associated with about a same time as the second time series of images.

In Example 4, Example 3 further includes determining correlation values between pixels of a first image of the first time series of delta images that corresponds to a first earliest time of capture and pixels of a second image of the second time series of delta images that corresponds to a second earliest time of capture, and wherein the first ML model further operates based on the correlation values.

In Example 5, Example 4 further includes, wherein the first ML model includes first and second encoders in series with each other and first and second decoders that are also connected in series.

In Example 6, Example 5 further includes, wherein the second encoder receives the correlation values.

In Example 7, at least one of Examples 3-6 further includes determining correlation values between pixels of a first image of the first time series of delta images that corresponds to a first earliest time of capture and pixels of a second image of the second time series of delta images that corresponds to a second earliest time of capture, and wherein the second ML model further operates based on the correlation values.

Example 8 includes a non-transitory machine-readable medium including instructions that, when executed by a machine, cause the machine to perform the method of one of Examples 1-7.

Example 9 includes a system comprising processing circuitry, and a memory including instructions that, when executed by the processing circuitry, cause the processing circuitry to perform operations comprising the method of one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instance or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, from a neuromorphic sensor, a time series of delta images;
   receiving auxiliary data indicating (i) an orientation, location, direction, or speed of the neuromorphic sensor, or (ii) metadata of the neuromorphic sensor, the auxiliary data associated with about a same time as the time series of images;

operating, based on an image of the time series of delta images and auxiliary data of the auxiliary data associated with the image as occurring at about a same time, a first machine learning (ML) model resulting in a low-resolution image; and
operating, based on the low-resolution image, a second ML model resulting in a high-resolution image, the high-resolution image of a type different than that produced by the neuromorphic sensor.

2. The method of claim 1, wherein the time series of delta images is a first time series of delta images, the method further comprising:
   receiving, from the neuromorphic sensor, a second time series of delta images, a last delta image of the first time series of delta images immediately preceding a first delta image of the second time series of delta images.

3. The method of claim 2, further comprising receiving second auxiliary data indicating (i) an orientation, location, direction, or speed of the neuromorphic sensor during capture of the second time series of delta images, or (ii) metadata of the neuromorphic sensor, the second auxiliary data associated with about a same time as the second time series of images.

4. The method of claim 3, further comprising:
   determining correlation values between pixels of a first image of the first time series of delta images that corresponds to a first earliest time of capture and pixels of a second image of the second time series of delta images that corresponds to a second earliest time of capture; and
   wherein the first ML model further operates based on the correlation values.

5. The method of claim 4, wherein the first ML model includes first and second encoders in series with each other and first and second decoders that are also connected in series.

6. The method of claim 5, wherein the second encoder receives the correlation values.

7. The method of claim 3, further comprising:
   determining correlation values between pixels of a first image of the first time series of delta images that corresponds to a first earliest time of capture and pixels of a second image of the second time series of delta images that corresponds to a second earliest time of capture; and
   wherein the second ML model further operates based on the correlation values.

8. A system comprising:
   a neuromorphic sensor configured to generate a time series of delta images;
   processing circuitry configured to receive auxiliary data indicating (i) an orientation, location, direction, or speed of the neuromorphic sensor, or (ii) metadata of the neuromorphic sensor, the auxiliary data associated with about a same time as the time series of images;
   operate, based on an image of the time series of delta images and auxiliary data of the auxiliary data associated with the image as occurring at about a same time, a first machine learning (ML) model resulting in a low-resolution image; and
   operate, based on the low-resolution image, a second ML model resulting in a high-resolution image, the high-resolution image of a type different than that produced by the neuromorphic sensor.

9. The system of claim 8, wherein the time series of delta images is a first time series of delta images, the processing circuitry is further configured to:

receive, from the neuromorphic sensor, a second time series of delta images, a last delta image of the first time series of delta images immediately preceding a first delta image of the second time series of delta images.

10. The system of claim 9, wherein the processing circuitry is further configured to receive second auxiliary data indicating (i) an orientation, location, direction, or speed of the neuromorphic sensor during capture of the second time series of delta images, or (ii) metadata of the neuromorphic sensor, the second auxiliary data associated with about a same time as the second time series of images.

11. The system of claim 10, wherein the processing circuitry is further configured to:

determine correlation values between pixels of a first image of the first time series of delta images that corresponds to a first earliest time of capture and pixels of a second image of the second time series of delta images that corresponds to a second earliest time of capture; and wherein the first ML model further operates based on the correlation values.

12. The system of claim 11, wherein the first ML model includes first and second encoders in series with each other and first and second decoders that are also connected in series.

13. The system of claim 12, wherein the second encoder receives the correlation values.

14. The system of claim 10, wherein the processing circuitry is further configured to:

determine correlation values between pixels of a first image of the first time series of delta images that corresponds to a first earliest time of capture and pixels of a second image of the second time series of delta images that corresponds to a second earliest time of capture; and wherein the second ML model further operates based on the correlation values.

15. A non-transitory machine readable medium including instructions that, when executed by a machine, cause the machine to perform operations for implementing a virtual image sensor, the operations comprising:

receiving, from a neuromorphic sensor, a time series of delta images;

receiving auxiliary data indicating (i) an orientation, location, direction, or speed of the neuromorphic sensor, or (ii) metadata of the neuromorphic sensor, the auxiliary data associated with about a same time as the time series of images;

operating, based on an image of the time series of delta images and auxiliary data of the auxiliary data associated with the image as occurring at about a same time, a first machine learning (ML) model resulting in a low-resolution image; and operating, based on the low-resolution image, a second ML model resulting in a high-resolution image, the high-resolution image of a type different than that produced by the neuromorphic sensor.

16. The non-transitory machine-readable medium of claim 15, wherein the time series of delta images is a first time series of delta images, the operations further comprising:

receiving, from a neuromorphic sensor, a second time series of delta images, a last delta image of the first time series of delta images immediately preceding a first delta image of the second time series of delta images.

17. The non-transitory machine-readable medium of claim 16, wherein the operations further comprise receiving second auxiliary data indicating (i) an orientation, location, direction, or speed of the neuromorphic sensor during capture of the second time series of delta images, or (ii) metadata of the neuromorphic sensor, the second auxiliary data associated with about a same time as the second time series of images.

18. The non-transitory machine-readable medium of claim 17, wherein the operations further comprise:

determining correlation values between pixels of a first image of the first time series of delta images that corresponds to a first earliest time of capture and pixels of a second image of the second time series of delta images that corresponds to a second earliest time of capture; and wherein the first ML model further operates based on the correlation values.

19. The non-transitory machine-readable medium of claim 18, wherein the first ML model includes first and second encoders in series with each other and first and second decoders that are also connected in series.

20. The non-transitory machine-readable medium of claim 19, wherein the second encoder receives the correlation values.

* * * * *